United States Patent
Lu et al.

(10) Patent No.: US 11,761,107 B2
(45) Date of Patent: Sep. 19, 2023

(54) COPPER ELECTROPLATING BATHS CONTAINING COMPOUNDS OF REACTION PRODUCTS OF AMINES, POLYACRYLAMIDES AND SULTONES

(71) Applicants: Dow Global Technologies LLC, Midland, MI (US); Rohm and Haas Electronic Materials LLC, Marlborough, MA (US)

(72) Inventors: Weijing Lu, Fanling (HK); Lingli Duan, Pudong District (CN); Zukhra Niazimbetova, Westborough, MA (US); Chen Chen, Pudong District (CN); Maria Rzeznik, Shrewsbury, MA (US)

(73) Assignee: ROHM AND HAAS ELECTRONIC MATERIALS LLC, Marlborough, MA (US)

( * ) Notice: Subject to any disclaimer, the term of this patent is extended or adjusted under 35 U.S.C. 154(b) by 695 days.

(21) Appl. No.: 16/745,400

(22) Filed: Jan. 17, 2020

(65) Prior Publication Data
US 2020/0149176 A1    May 14, 2020

Related U.S. Application Data

(62) Division of application No. 15/752,636, filed as application No. PCT/CN2015/091435 on Oct. 8, 2015, now Pat. No. 10,604,858.

(51) Int. Cl.
C25D 3/38 (2006.01)
C25D 3/58 (2006.01)
C25D 7/12 (2006.01)
C08G 73/02 (2006.01)

(52) U.S. Cl.
CPC .............. *C25D 3/38* (2013.01); *C08G 73/02* (2013.01); *C25D 3/58* (2013.01); *C25D 7/12* (2013.01)

(58) Field of Classification Search
CPC ............ C25D 3/38; C25D 3/58; C08G 73/02
See application file for complete search history.

(56) References Cited

U.S. PATENT DOCUMENTS

| | | |
|---|---|---|
| 5,534,611 A * | 7/1996 | Huddleston ............ C08G 79/04 528/229 |
| 9,631,292 B2 | 4/2017 | Roeger-Goepfert et al. |
| 9,758,885 B2 | 9/2017 | Kienle et al. |
| 10,604,858 B2 * | 3/2020 | Lu ............................ C25D 7/12 |
| 2014/0097092 A1 | 4/2014 | Roeger-Goepfert et al. |
| 2015/0108070 A1 * | 4/2015 | Kim ........................ C02F 1/683 210/688 |
| 2015/0284865 A1 | 10/2015 | Kinle et al. |

FOREIGN PATENT DOCUMENTS

FR    2453847 A1    11/1980

OTHER PUBLICATIONS

Jiang et.al; "Synthesis and Diels-Alder reactions of prop-1-ene-1,3-sultone, and chemical transformations of the Diels-Alder adducts"; (Year: 1999).*
Search report for corresponding China Application No. 201580083217.6 dated Oct. 21, 2019.
Search report for corresponding European Application No. 15 90 5663 dated Mar. 8, 2019.

* cited by examiner

*Primary Examiner* — Nathanael T Zemui
(74) *Attorney, Agent, or Firm* — John J. Piskorski

(57) ABSTRACT

Copper electroplating baths include reaction products of amines, polyacrylamides and sultones. The reaction products function as levelers and enable copper electroplating baths which have high throwing power and provide copper deposits with reduced nodules.

2 Claims, No Drawings

COPPER ELECTROPLATING BATHS CONTAINING COMPOUNDS OF REACTION PRODUCTS OF AMINES, POLYACRYLAMIDES AND SULTONES

The present application is a divisional application of co-pending application Ser. No. 15/752,636, filed Feb. 14, 2018.

FIELD OF THE INVENTION

The present invention is directed copper electroplating baths containing compounds of reaction products of amines, polyacrylamides and sultones. More specifically, the present invention is directed to copper electroplating baths containing compounds of reaction products of amines, polyacrylamides and sultones which have high throwing power and copper deposits with reduced nodules.

BACKGROUND OF THE INVENTION

Methods for electroplating articles with metal coatings generally involve passing a current between two electrodes in a plating solution where one of the electrodes is the article to be plated. A typical acid copper electroplating solution includes dissolved copper, usually copper sulfate, an acid electrolyte such as sulfuric acid in an amount sufficient to impart conductivity to the bath, a source of halide, and proprietary additives to improve the uniformity of the plating and the quality of the metal deposit. Such additives include levelers, accelerators and suppressors, among others.

Electrolytic copper plating solutions are used in a variety of industrial applications, such as decorative and anticorrosion coatings, as well as in the electronics industry, particularly for the fabrication of printed circuit boards and semiconductors. For circuit board fabrication, typically, copper is electroplated over selected portions of the surface of a printed circuit board, into blind vias and trenches and on the walls of through-holes passing between the surfaces of the circuit board base material. The exposed surfaces of blind vias, trenches and through-holes, i.e., the walls and the floor, are first made conductive, such as by electroless metallization, before copper is electroplated on surfaces of these apertures. Plated through-holes provide a conductive pathway from one board surface to the other. Vias and trenches provide conductive pathways between circuit board inner layers. For semiconductor fabrication, copper is electroplated over a surface of a wafer containing a variety of features such as vias, trenches or combinations thereof. The vias and trenches are metallized to provide conductivity between various layers of the semiconductor device.

It is well known in certain areas of plating, such as in electroplating of printed circuit boards ("PCBs"), that the use of levelers in the electroplating bath can be crucial in achieving a uniform metal deposit on a substrate surface. Electroplating a substrate having irregular topography can pose difficulties. During electroplating a voltage drop typically occurs within apertures in a surface, which can result in an uneven metal deposit between the surface and the apertures. Electroplating irregularities are exacerbated where the voltage drop is relatively extreme, that is, where the apertures are narrow and tall. Consequently, depositing a metal layer of substantially uniform thickness is frequently a challenging step in the manufacture of electronic devices.

Leveling agents are often used in copper plating baths to provide substantially uniform, or level, copper layers in electronic devices.

The trend of portability combined with increased functionality of electronic devices has driven the miniaturization of PCBs. Conventional multilayer PCBs with through-hole interconnects are not always a practical solution. Alternative approaches for high density interconnects have been developed, such as sequential build up technologies, which utilize blind vias. One of the objectives in processes that use blind vias is the maximizing of via filling while minimizing thickness variation in the copper deposit between the vias and the substrate surface. This is particularly challenging when the PCB contains both through-holes and blind vias.

Leveling agents are used in copper plating baths to level the deposit across the substrate surface and to improve the throwing power of the electroplating bath. Throwing power is defined as the ratio of the through-hole center copper deposit thickness to its thickness at the surface. Newer PCBs are being manufactured that contain both through-holes and blind vias. Current bath additives, in particular current leveling agents, do not always provide level copper deposits between the substrate surface and filled through-holes and blind vias. Via fill is characterized by the difference in height between the copper in the filled via and the surface. Accordingly, there remains a need in the art for leveling agents for use in metal electroplating baths for the manufacture of PCBs that provide level copper deposits while bolstering the throwing power of the bath.

SUMMARY OF THE INVENTION

A compound including a reaction product including a sultone, an amine and an acrylamide, wherein the amine has a formula:

where R' is selected from hydrogen or a moiety: —CH$_2$-CH$_2$—; R is selected from H$_2$N—(CH$_2$)$_m$—, HO—(CH$_2$)$_m$, —HN—CH$_2$-CH$_2$—, Q-(CH$_2$)$_m$—, a moiety having a structure:

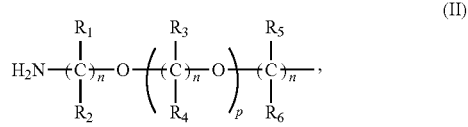

a moiety having a structure:

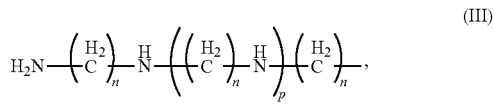

or a moiety having a structure:

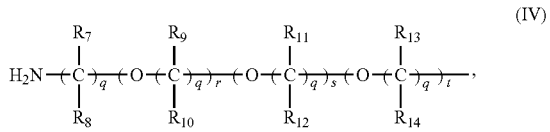

(IV)

where $R_1$-$R_{14}$ are independently chosen from hydrogen and $(C_1$-$C_3)$alkyl; m is an integer from 2-12, n is an integer from 2-10, p is an integer from 1-10, q is an integer from 2-10 and r, s and t are numbers from 1 to 10; Q is a 5-6 membered heterocyclic ring having one or two nitrogen atoms in the ring or Q is a benzene sulfonamide moiety; and with a proviso that when R' is —$CH_2$-$CH_2$—, R is —HN—$CH_2$-$CH_2$— and the nitrogen of R forms a covalent bond with a carbon atom of R' to form a heterocyclic ring; and the acrylamide has a formula:

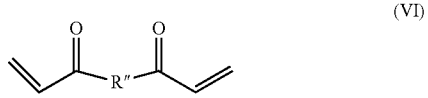

(VI)

wherein R" is selected from a moiety having a structure:

(VII)

a moiety having a structure:

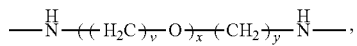

(VIII)

a moiety having a structure:

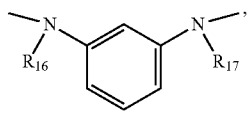

(IX)

or a substituted or unsubstituted triazinane ring or a piperizine ring, wherein $R_{15}$ is selected from hydrogen or hydroxyl; u is an integer from 1 to 2 and v, x and y are independently integers of 1 to 10; $R_{16}$ and $R_{17}$ are independently chosen from hydrogen and carbonyl moiety, and with the proviso that when $R_{16}$ and $R_{17}$ are carbonyl moieties, the carbonyl moieties form a covalent bond with the carbons of the vinyl groups of formula (VI) displacing a hydrogen to form the covalent bond with the carbons of the vinyl groups to form a five membered heterocyclic ring.

An electroplating bath includes one or more sources of copper ions, one or more accelerators, one or more suppressors, one or more electrolytes and one or more of the compounds described above.

A method of electroplating includes providing a substrate; immersing the substrate in the electroplating bath including one or more sources of copper ions, one or more accelerators, one or more suppressors, one or more electrolytes and one or more of the compounds described above; applying a current to the substrate and the electroplating bath; and electroplating copper on the substrate.

The compounds provide copper layers having a substantially level surface across a substrate, even on substrates having small features and on substrates having a variety of feature sizes. The electroplating methods effectively deposit copper on substrates and in blind vias and through-holes such that the copper plating baths have high throwing power. In addition, the copper deposits have reduced nodules.

DETAILED DESCRIPTION OF THE INVENTION

As used throughout this specification the following abbreviations shall have the following meanings unless the context clearly indicates otherwise: A =amperes; $A/dm^2$=amperes per square decimeter; ° C.=degrees Centigrade; g=gram; ppm=parts per million=mg/L; L=liter, μm=micron=micrometer; mm=millimeters; cm=centimeters; DI=deionized; mL=milliliter; mol=moles; mmol=millimoles; Mw=weight average molecular weight; Mn=number average molecular weight;

and PCB=printed circuit board. All numerical ranges are inclusive and combinable in any order, except where it is clear that such numerical ranges are constrained to add up to 100%.

As used throughout the specification, "feature" refers to the geometries on a substrate. "Aperture" refers to recessed features including through-holes and blind vias. As used throughout this specification, the term "plating" refers to electroplating. "Deposition" and "plating" are used interchangeably throughout this specification. "Leveler" refers to an organic compound or salt thereof that is capable of providing a substantially level or planar metal layer. The terms "leveler" and "leveling agent" are used interchangeably throughout this specification. "Accelerator" refers to an organic additive that increases the plating rate of the electroplating bath. "Suppressor" refers to an organic additive that suppresses the plating rate of a metal during electroplating. The terms "printed circuit boards" and "printed wiring boards" are used interchangeably throughout this specification. The term "moiety" means a part of a molecule or polymer that may include either whole functional groups or parts of functional groups as substructures. The terms "moiety" and "group" are used interchangeably throughout the specification. The articles "a" and "an" refer to the singular and the plural.

Compounds include reaction products including sultones, amines and acrylamides. Amines of the present invention have a formula:

(I)

where R' is selected from hydrogen or a moiety —$CH_2$-$CH_2$—, preferably R' is hydrogen; R is selected from moieties H$_2$N—(CH$_2$)$_m$—, HO—(CH$_2$)$_m$—, —HN—CH$_2$-CH$_2$—, Q-(CH$_2$)$_m$—, a moiety having a structure:

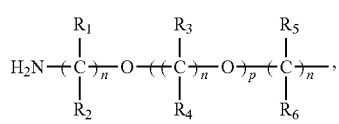
(II)

a moiety having a structure:

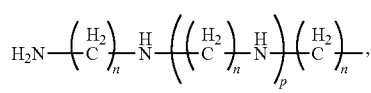
(III)

or a moiety having a structure:

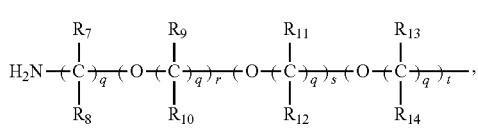
(IV)

where R$_1$-R$_{14}$ are independently chosen from hydrogen and (C$_1$-C$_3$)alkyl, preferably R$_1$-R$_6$ are independently chosen from hydrogen and methyl, more preferably R$_1$-R$_6$ are chosen from hydrogen; preferably R$_7$-R$_{14}$ are independently chosen from hydrogen and methyl; m is an integer from 2-12, preferably from 2-3, n is an integer from 2-10, preferably 2-5, p is an integer from 1-10, preferably 1-5, more preferably from 1-4, q is an integer from 2-10 and r, s and t are independently numbers from 1 to 10; Q is a 5-6 membered heterocyclic ring having one or two nitrogen atoms in the ring such as an imidazole or pyridine moiety, or Q is a benzene sulfonamide moiety having structure (V) below; and with a proviso that when R' is —CH$_2$-CH$_2$—, R is —HN—CH$_2$-CH$_2$— and the nitrogen of R forms a covalent bond with a carbon of R' to form a heterocyclic ring such as a piperizine ring. A most preferred amine is an amine where R' is hydrogen and R is H$_2$N—(CH$_2$)$_m$—.

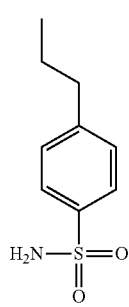
(V)

Amines having formula (I) include, but are not limited to ethylene diamine, aminoethan-1-ol, 2,2'-(ethylenedioxy)bis(ethylamine), 3,3'-(butane-1,4-dihylbis(oxy))bis(propan-1-amine), poly(1-(2-((3-(2-aminopropoxy)butan-2-yl)oxy)ethoxy)propan-2-amine) and 4-(2-aminoethyl)benzene sulfonamide.

When n is 2 and p is 5 a preferred compound having moiety (II) is 6,8,11,15,17-pentamethyl-4, 7,10,13,16,19-hexaoxadocosane-2,21-diamine which has the following structure:

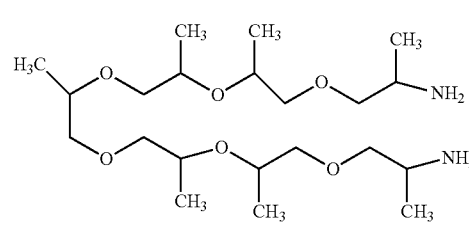
(II)a

A preferred compound having moiety (IV) has the following structure:

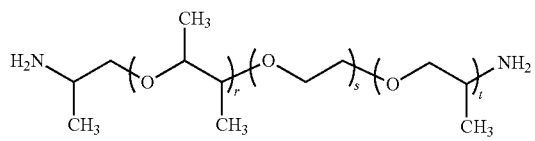
(IV)a where the variables r, s and t are defined above. Preferably the Mw ranges from 200 g/mole to 2000 g/mole.

Acrylamides include compounds having a formula:

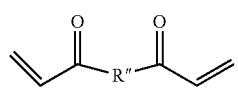
(VI)

wherein R" is a moiety having a structure:

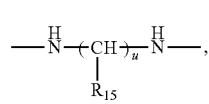
(VII)

a moiety having a structure:

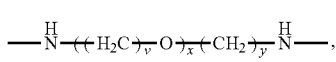
(VIII)

a moiety having a structure:

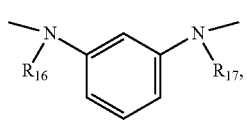
(IX)

or a substituted or unsubstituted triazinane ring or a piperizine ring, wherein R$_{15}$ is selected from hydrogen or hydroxyl, preferably R$_{15}$ is hydrogen; u is an integer from 1 to 2, preferably 1, and v, x and y are independently integers of 1 to 10; $R_{16}$ and $R_{17}$ are independently chosen from hydrogen and carbonyl moiety with the proviso that when $R_{16}$ and $R_{17}$ are carbonyl moieties, the carbonyl moieties form a covalent bond with the carbons of the vinyl groups of formula (VI) displacing a hydrogen to form the covalent bond with the carbons of the vinyl groups and form a five membered heterocyclic ring having a structure:

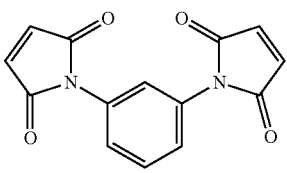

(X)

One or more sultones are included as a third reactant. Sultones are cyclic sulfonic acid esters. Preferably, such sultones include, but are not limited to, compounds having formula:

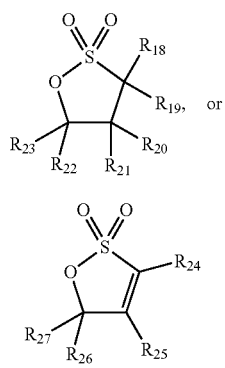

(XI)

(XII)

where $R_{18}$-$R_{27}$ are independently chosen from hydrogen, ($C_1$-$C_3$)alkyl, hydroxyl, and acetate moiety. Preferably $R_{18}$-$R_{27}$ are independently chosen from hydrogen, methyl, ethyl and hydroxyl. More preferably $R_{18}$, $R_{19}$, $R_{21}$, $R_{22}$, $R_{23}$, $R_{24}$, $R_{26}$ and $R_{27}$ are hydrogen and $R_{20}$ and $R_{25}$ are independently chosen from hydrogen and hydroxyl. Most preferably $R_{18}$-$R_{27}$ are hydrogen. Preferably the sultone is structure (XI) where $R_{18}$-$R_{23}$ are hydrogen.

Compounds of structure (XI) include 1,3-propane sultone, 2-hydroxy-1,3-propanesultone and 2-acetoxy-1,3-propanesultone and compounds of structure (XII) include 1,3-propenesultone.

The reaction products of the present invention may be prepared by Michael addition. Conventional Michael addition procedures may be followed to prepare the reaction products of the present invention. Amines function as Michael addition donors and acrylamides are Michael addition acceptors. In general sufficient amount of acrylamide is added to a reaction vessel followed by adding sufficient amount of solvent such as ethanol, dichloromethane, ethyl acetate, acetone, water or mixtures thereof. A sufficient amount of amine is then added to the reaction vessel. The reaction may be done at room temperature to 110° C. or such as from room temperature to 60° C. for 18-24 hours or 4-6 hours. A sultone is then added to the reaction mixture. The temperature of the mixture may be maintained at 80° C. to 95° C. Heating with stirring is done for 1 hour to 4 hours.

The molar ratio of the amine, acrylamide and sultone is typically 1:1:1; however, the ratios may vary depending on the specific reaction products used. Minor experimentation may be used to determine the proper molar ratios for given reactants.

The plating baths and methods which include one or more of the reaction products are useful in providing a substantially level plated metal layer on a substrate, such as a printed circuit board or semiconductor chip. Also, the plating baths and methods are useful in filling apertures in a substrate with metal. The copper deposits have good throwing power and reduced nodule formation.

Any substrate upon which copper can be electroplated may be used as a substrate with the copper plating baths containing the reaction products. Such substrates include, but are not limited to: printed wiring boards, integrated circuits, semiconductor packages, lead frames and interconnects. An integrated circuit substrate may be a wafer used in a dual damascene manufacturing process. Such substrates typically contain a number of features, particularly apertures, having a variety of sizes. Through-holes in a PCB may have a variety of diameters, such as from 50 μm to 350 μm in diameter. Such through-holes may vary in depth, such as from 0.8 mm to 10 mm. PCBs may contain blind vias having a wide variety of sizes, such as up to 200 μm diameter and 150 μm depth, or greater.

The copper plating baths contain a source of copper ions, an electrolyte, and a leveling agent, where the leveling agent is a reaction product of an amine, an acrylamide and a sultone as described above. The copper plating baths may contain a source of halide ions, an accelerator and a suppressor. Optionally, in addition to copper, the electroplating baths may include one or more sources of tin for electroplating a copper/tin alloy. Preferably the electroplating baths are copper electroplating baths.

Suitable copper ion sources are copper salts and include without limitation: copper sulfate; copper halides such as copper chloride; copper acetate; copper nitrate; copper tetrafluoroborate; copper alkylsulfonates; copper arylsulfonates; copper sulfamate; copper perchlorate and copper gluconate. Exemplary copper alkane sulfonates include copper ($C_1$-$C_6$) alkane sulfonate and more preferably copper ($C_1$-$C_3$)alkane sulfonate. Preferred copper alkane sulfonates are copper methanesulfonate, copper ethanesulfonate and copper propanesulfonate. Exemplary copper arylsulfonates include, without limitation, copper benzenesulfonate and copper p-toluenesulfonate. Mixtures of copper ion sources may be used. One or more salts of metal ions other than copper ions may be added to the present electroplating baths. Typically, the copper salt is present in an amount sufficient to provide an amount of copper metal of 10 to 400 g/L of plating solution.

Suitable tin compounds include, but are not limited to salts, such as tin halides, tin sulfates, tin alkane sulfonate such as tin methane sulfonate, tin aryl sulfonate such as tin benzenesulfonate and tin p-toluenesulfonate. The amount of tin compound in these electrolyte compositions is typically an amount that provides a tin content in the range of 5 to 150 g/L. Mixtures of tin compounds may be used in an amount as described above.

The electrolyte useful in the present invention is acidic. Preferably, the pH of the electrolyte is ≤2. Suitable acidic electrolytes include, but are not limited to, sulfuric acid, acetic acid, fluoroboric acid, alkanesulfonic acids such as methanesulfonic acid, ethanesulfonic acid, propanesulfonic acid and trifluoromethane sulfonic acid, aryl sulfonic acids such as benzenesulfonic acid, p-toluenesulfonic acid, sulfamic acid, hydrochloric acid, hydrobromic acid, perchloric acid, nitric acid, chromic acid and phosphoric acid. Mixtures of acids may be advantageously used in the present metal plating baths. Preferred acids include sulfuric acid, methanesulfonic acid, ethanesulfonic acid, propanesulfonic acid, hydrochloric acid and mixtures thereof. The acids may be present in an amount in the range of 1 to 400 g/L. Electrolytes are generally commercially available from a variety of sources and may be used without further purification.

Such electrolytes may optionally contain a source of halide ions. Typically chloride ions are used. Exemplary chloride ion sources include copper chloride, tin chloride, sodium chloride, potassium chloride and hydrochloric acid. A wide range of halide ion concentrations may be used in the present invention. Typically, the halide ion concentration is in the range of 0 to 100 ppm based on the plating bath. Such halide ion sources are generally commercially available and may be used without further purification.

The plating baths typically contain an accelerator. Any accelerators (also referred to as brightening agents) are suitable for use in the present invention. Such accelerators are well-known to those skilled in the art. Accelerators include, but are not limited to, N,N-dimethyl-dithiocarbamic acid-(3-sulfopropyl)ester; 3-mercapto-propylsulfonic acid-(3-sulfopropyl)ester; 3-mercapto-propylsulfonic acid sodium salt; carbonic acid,dithio-O-ethylester-S-ester with 3-mercapto-1-propane sulfonic acid potassium salt; bis-sulfopropyl disulfide; bis-(sodium sulfopropyl)-disulfide; 3-(benzothiazolyl-S-thio)propyl sulfonic acid sodium salt; pyridinium propyl sulfobetaine; 1-sodium-3-mercaptopropane-l-sulfonate; N,N-dimethyl-dithiocarbamic acid-(3-sulfoethyl)ester; 3-mercapto-ethyl propylsulfonic acid-(3-sulfoethyl)ester; 3-mercapto-ethylsulfonic acid sodium salt; carbonic acid-dithio-O-ethylester-S-ester with 3-mercapto-1-ethane sulfonic acid potassium salt; bis-sulfoethyl disulfide; 3-(benzothiazolyl-S-thio)ethyl sulfonic acid sodium salt; pyridinium ethyl sulfobetaine; and 1-sodium-3-mercaptoethane-1-sulfonate. Accelerators may be used in a variety of amounts. In general, accelerators are used in an amount in a range of 0.1 ppm to 1000 ppm.

Any compound capable of suppressing the metal plating rate may be used as a suppressor in the present electroplating compositions. Suitable suppressors include, but are not limited to, polypropylene glycol copolymers and polyethylene glycol copolymers, including ethylene oxide-propylene oxide ("EO/PO") copolymers and butyl alcohol-ethylene oxide-propylene oxide copolymers. Suitable butyl alcohol-ethylene oxide-propylene oxide copolymers are those having a weight average molecular weight of 100 to 100,000 g/mole, preferably 500 to 10,000 g/mole. When such suppressors are used, they are typically present in an amount in the range of 1 to 10,000 ppm based on the weight of the composition, and more typically from 5 to 10,000 ppm. The leveling agents of the present invention may also possess functionality capable of acting as suppressors.

In general, the reaction products have a number average molecular weight (Mn) of 200 to 100,000 g/mole, typically from 300 to 50,000 g/mole, preferably from 500 to 30,000 g/mole, although reaction products having other Mn values may be used. Such reaction products may have a weight average molecular weight (Mw) value in the range of 1000 to 50,000 g/mole, typically from 5000 to 30,000 g/mole, although other Mw values may be used.

The amount of the reaction product, i.e., leveling agent, used in the electroplating baths depends upon the particular leveling agents selected, the concentration of the metal ions in the electroplating bath, the particular electrolyte used, the concentration of the electrolyte and the current density applied. In general, the total amount of the leveling agent in the electroplating baths ranges from 0.01 ppm to 1000 ppm, preferably from 0.1 ppm to 250 ppm, more preferably from 1 ppm to 100 ppm, most preferably from 5 ppm to 50 ppm based on the total weight of the plating bath, although greater or lesser amounts may be used.

The electroplating baths may be prepared by combining the components in any order. It is preferred that the inorganic components such as source of metal ions, water, electrolyte and optional halide ion source are first added to the bath vessel, followed by the organic components such as leveling agent, accelerator, suppressor, and any other organic component. The electroplating baths may optionally contain at least one additional leveling agent.

Such additional leveling agents may be another leveling agent of the present invention, or alternatively, may be any conventional leveling agent. Suitable conventional leveling agents that can be used in combination with the present leveling agents include, without limitations, those disclosed in U.S. Pat. Nos. 6,610,192 to Step et al., 7,128,822 to Wang et al., 7,374,652 to Hayashi et al. and 6,800,188 to Hagiwara et al. Such combination of leveling agents may be used to tailor the characteristics of the plating bath, including leveling ability and throwing power.

Typically, the plating baths may be used at any temperature from 10 to 65° C. or higher. Preferably, the temperature of the plating bath is from 10 to 35° C. and more preferably from 15 to 30° C.

In general, the electroplating baths are agitated during use. Any suitable agitation method may be used and such methods are well-known in the art. Suitable agitation methods include, but are not limited to: air sparging, work piece agitation, and impingement.

Typically, a substrate is electroplated by contacting the substrate with the plating bath. The substrate typically functions as the cathode. The plating bath contains an anode, which may be soluble or insoluble. Potential is typically applied to the electrodes. Sufficient current density is applied and plating performed for a period of time sufficient to deposit a metal layer having a desired thickness on the substrate as well as to fill blind vias, trenches and through-holes, or to conformally plate through-holes. Current densities may range from 0.05 to 10 A/dm$^2$, although higher and lower current densities may be used. The specific current density depends in part upon the substrate to be plated, the composition of the plating bath, and the desired surface metal thickness. Such current density choice is within the abilities of those skilled in the art.

An advantage of the present invention is that substantially level metal deposits are obtained on a PCB. Through-holes, blind vias or combinations thereof in the PCB are substantially filled or through-holes are conformally plated with desirable throwing power. A further advantage of the present invention is that a wide range of apertures and aperture sizes may be filled or conformally plated with desirable throwing power.

Throwing power is defined as the ratio of the average thickness of the metal plated in the center of a through-hole compared to the average thickness of the metal plated at the surface of the PCB sample and is reported as a percentage. The higher the throwing power, the better the plating bath is able to conformally plate the through-hole. Metal plating compositions of the present invention have a throwing power of ≥45%, preferably ≥50%.

The reaction products provide copper and copper/tin layers having a substantially level surface across a substrate, even on substrates having small features and on substrates having a variety of feature sizes. The plating methods effectively deposit metals in through-holes such that the electroplating baths have good throwing power.

While the methods of the present invention have been generally described with reference to printed circuit board manufacture, it is appreciated that the present invention may be useful in any electrolytic process where an essentially level or planar copper or copper/tin deposit and filled or conformally plated apertures are desired. Such processes include semiconductor packaging and interconnect manufacture.

The following examples are intended to further illustrate the invention but are not intended to limit its scope.

Example 1

Into a three necked flask 30 mmol N,N'methylenebiacrylamide was added. 10 mL dichloromethane and 20 mL ethanol was added to the flask. The reaction mixture looked cloudy and 30 mmoles ethylenediamine was then added to the mixture. The reaction mixture was kept at room temperature for 19 hours. A large amount of solid was formed in the reaction mixture. 30 mmoles 1,3-propanesultone was added into the reaction mixture and another 5 mL ethanol was added. Then the temperature of the reaction was increased to 90° C. for 1 hour and the reaction mixture turned turbid again. All of the solvent was removed by vacuum evaporation and reaction product 1 was a white foam solid with good solubility in water.

Example 2

A plurality of copper electroplating baths were prepared by combining 75 g/L copper as copper sulfate pentahydrate, 240 g/L sulfuric acid, 60 ppm chloride ion, 1 ppm of an accelerator and 1.5 g/L of a suppressor. The accelerator was bis(sodium-sulfopropyl)disulfide. The suppressor was an EO/PO copolymer having a weight average molecular weight of <5,000 and terminal hydroxyl groups. Each electroplating bath also contained the reaction product of Example 1 in amounts of 5 ppm, 10 ppm or 20 ppm as shown in the table in Example 3 below. The reaction product was used without purification.

Example 3

Samples of 3.2 mm thick, double-sided FR4 PCBs, 5 cm×9.5 cm, having a plurality of through-holes were electroplated with copper in Haring cells using the copper electroplating baths of Example 2. The samples had 0.25 mm diameter through-holes. The temperature of each bath was 25° C. A current density of 3 A/dm$^2$ was applied to the samples for 40 minutes. The copper plated samples were analyzed to determine the throwing power ("TP") of the plating baths, and the number of nodules on the copper deposits.

Throwing power was calculated by determining the ratio of the average thickness of the copper plated in the center of a through-hole compared to the average thickness of the copper plated at the surface of the PCB sample. The throwing power was reported as a percentage.

| Reaction Product | Leveler (ppm) | % TP | Nodules |
|---|---|---|---|
| 1 | 5 | 47 | 0 |
|  | 10 | 54 | 0 |
|  | 20 | 66 | 0 |

The results showed that the throwing power exceeded 45% indicating good throwing power performance for the reaction products. In addition, no nodules were observed on any of the copper deposits.

Example 4

The method of Example 1 is repeated except the sultone added to the reaction mixture is 30 mmol of 2-hydroxy-1,3-propanesultone. Reaction product 2 is used without purification.

A plurality of copper electroplating baths are then prepared by combining 75 g/L copper as copper sulfate pentahydrate, 240 g/L sulfuric acid, 60 ppm chloride ion, 1 ppm of an accelerator and 1.5 g/L of a suppressor. The accelerator is bis(sodium-sulfopropyl)disulfide. The suppressor is an EO/PO copolymer having a weight average molecular weight of <5,000 and terminal hydroxyl groups. Each electroplating bath also contains reaction product 2 in amounts of 5 ppm, 10 ppm or 20 ppm.

Samples of 3.2 mm thick, double-sided FR4 PCBs, 5 cm×9.5 cm, having a plurality of through-holes are electroplated with copper in Haring cells using the copper electroplating baths. The samples have 0.25 mm diameter through-holes. The temperature of each bath is 25° C. A current density of 3 A/dm$^2$ is applied to the samples for 40 minutes. The copper plated samples are analyzed as described in Example 3 above to determine the throwing power ("TP") of the plating baths, and the number of nodules on the copper deposits. The % TP for each bath is expected to be greater than 45% and no nodules are expected to be seen on the copper deposits.

Example 5

The method of Example 1 is repeated except the sultone added to the reaction mixture is 30 mmol of 2-acetoxy-1,3-propanesultone. Reaction product 3 is used without purification.

A plurality of copper electroplating baths are then prepared by combining 75 g/L copper as copper sulfate pentahydrate, 240 g/L sulfuric acid, 60 ppm chloride ion, 1 ppm of an accelerator and 1.5 g/L of a suppressor. The accelerator is bis(sodium-sulfopropyl)disulfide. The suppressor is an EO/PO copolymer having a weight average molecular weight of <5,000 and terminal hydroxyl groups. Each electroplating bath also contains reaction product 3 in amounts of 5 ppm, 10 ppm or 20 ppm.

Samples of 3.2 mm thick, double-sided FR4 PCBs, 5 cm×9.5 cm, having a plurality of through-holes are electroplated with copper in Haring cells using the copper electroplating baths. The samples have 0.25 mm diameter through-holes. The temperature of each bath is 25° C. A current density of 3 A/dm$^2$ is applied to the samples for 40 minutes. The copper plated samples are analyzed as described in Example 3 above to determine the throwing power ("TP") of the plating baths, and the number of nodules on the copper deposits. The % TP for each bath is expected to be greater than 45% and no nodules are expected to be seen on the copper deposits.

Example 6

The method of Example 1 is repeated except the sultone added to the reaction mixture is 30 mmol of 1,3-propenesultone. Reaction product 4 is used without purification.

A plurality of copper electroplating baths are then prepared by combining 75 g/L copper as copper sulfate pentahydrate, 240 g/L sulfuric acid, 60 ppm chloride ion, 1 ppm of an accelerator and 1.5 g/L of a suppressor. The accelerator is bis(sodium-sulfopropyl)disulfide. The suppressor is an EO/PO copolymer having a weight average molecular weight of <5,000 and terminal hydroxyl groups. Each electroplating bath also contains reaction product 4 in amounts of 5 ppm, 10 ppm or 20 ppm.

Samples of 3.2 mm thick, double-sided FR4 PCBs, 5 cm×9.5 cm, having a plurality of through-holes are electroplated with copper in Haring cells using the copper electroplating baths. The samples have 0.25 mm diameter through-holes. The temperature of each bath is 25° C. A current density of 3 A/dm² is applied to the samples for 40 minutes. The copper plated samples are analyzed as described in Example 3 above to determine the throwing power ("TP") of the plating baths, and the number of nodules on the copper deposits. The % TP for each bath is expected to be greater than 45% and no nodules are expected to be seen on the copper deposits.

What is claimed is:

1. A compound comprising a reaction product of one or more compounds having the formula:

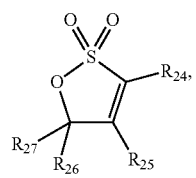

(XII)

wherein $R_{24}$-$R_{27}$ are independently chosen from hydrogen, $(C_1$-$C_3)$alkyl, hydroxyl, and acetate moiety, an amine and an acrylamide, wherein the amine has a formula:

(I)

wherein R' is hydrogen; R comprises $H_2N$—$(CH_2)_m$—, $HO$—$(CH_2)_m$—, $Q$-$(CH_2)_m$—, a moiety having a structure:

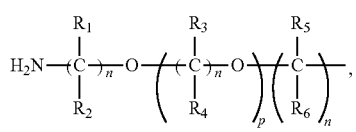

(II)

a moiety having a structure:

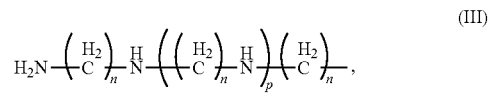

(III)

or a moiety having a structure:

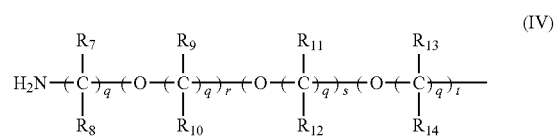

(IV)

where $R_1$-$R_{14}$ are independently chosen from hydrogen and $(C_1$-$C_3)$alkyl; m is an integer from 2-12, n is an integer from 2-10, p is an integer from 1-10, q is an integer from 2-10 and r, s and t are numbers from 1 to 10; Q is a 5-6 membered heterocyclic ring having one or two nitrogen atoms in the ring or Q is a benzene sulfonamide moiety; and the acrylamide has a formula:

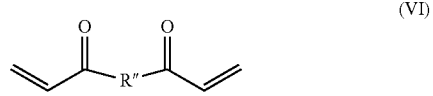

(VI)

wherein R" is a moiety having a structure:

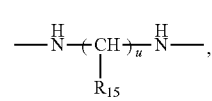

(VII)

a moiety having a structure:

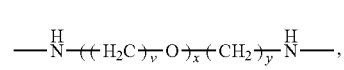

(VIII)

a moiety having a structure:

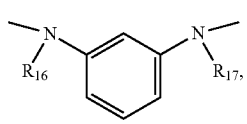

(IX)

or a substituted or unsubstituted triazinane ring or a piperizine ring, wherein $R_{15}$ comprises hydrogen or hydroxyl; u is an integer from 1 to 2 and v, x and y are independently integers of 1 to 10; $R_{16}$ and $R_{17}$ are independently chosen from hydrogen and carbonyl moiety, and with the proviso that when $R_{16}$ and $R_{17}$ are carbonyl moieties, the carbonyl moieties form a covalent bond with the carbons of the vinyl groups of formula (VI) displacing a hydrogen to form the covalent bond with the carbons of the vinyl groups to form a five membered heterocyclic ring.

2. The compound of claim 1, wherein the amine has a formula:
(I)
wherein R' is hydrogen and R is $H_2N-(CH_2)_m-$ and m is an integer of 2-3.
* * * * *